United States Patent [19]
Worst

[11] 3,934,227
[45] Jan. 20, 1976

[54] MEMORY CORRECTION SYSTEM

[75] Inventor: Bernard I. Worst, Flanders, N.J.

[73] Assignee: Digital Computer Controls, Inc., Fairfield, N.J.

[22] Filed: Dec. 5, 1973

[21] Appl. No.: 421,959

[52] U.S. Cl. .......................................... 340/172.5
[51] Int. Cl.² ........................................ G06F 13/00
[58] Field of Search ................... 340/172.5; 445/1

[56] References Cited
UNITED STATES PATENTS

| | | | |
|---|---|---|---|
| 3,588,830 | 6/1971 | Duda et al. ...................... | 340/172.5 |
| 3,659,275 | 4/1972 | Marshall .......................... | 340/172.5 |
| 3,665,426 | 5/1972 | Gross et al. ................... | 340/172.5 X |
| 3,753,242 | 8/1973 | Townsend ....................... | 340/172.5 |
| 3,771,137 | 11/1973 | Barner ............................. | 340/172.5 |
| 3,792,441 | 2/1974 | Wymore .......................... | 340/172.5 |

Primary Examiner—Harvey E. Springborn
Attorney, Agent, or Firm—Stephen E. Feldman

[57] ABSTRACT

Correct data stored in an overlay memory register is furnished to a processor, instead of incorrect data stored in a fixed memory register addressed by the processor, by providing a mapping memory that is addressed simultaneously with the addressing of the overlay memory and the fixed memory. The mapping memory is connected with the overlay memory and the fixed memory such that the state of the addressed mapping memory register will enable either the fixed memory or the overlay memory to carry out a data transfer to the processor. The states of the mapping memory registers are preselected in accordance with knowledge of which of the fixed memory registers contains incorrect data. When the processor addresses a fixed memory register containing incorrect data, the state of the addressed mapping memory register will be such as to disable the fixed memory thereby precluding it from transferring incorrect data to the processor, and, simultaneously, to enable the overlay memory thereby allowing the addressed overlay memory register to transfer correct data to the processor.

3 Claims, 3 Drawing Figures

| BLOCK LOCATION | FIXED MEM. ENABLE | OVER-LAY 1 | OVER-LAY 2 | ... | OVER-LAY P-1 |
|---|---|---|---|---|---|
| 0 | $O_1$ | 0 | 1 | | 1 |
| 1 | 1 | 1 | 1 | | 1 |
| 2 | $O_{P-1}$ | 1 | 1 | | 0 |
| 3 | 1 | 1 | 1 | | 1 |
| 4 | $O_2$ | 1 | 0 | ... | 1 |
| 5 | 1 | 1 | 1 | | 1 |
| • | • | • | • | | • |
| • | • | • | • | | • |
| • | • | • | • | | • |
| $2^m-1$ | 1 | 1 | 1 | | 1 |

FIG.3.

| ADDRESS | BIT 0 DATA | BIT 1 DATA | BIT 2 DATA | BIT 3 DATA |
|---|---|---|---|---|
| 0 | 0 | 0 | 1 | 1 |
| 1 | 1 | 1 | 1 | 1 |
| 2 | 0 | 1 | 1 | 0 |
| 3 | 1 | 1 | 1 | 1 |
| 4 | 0 | 1 | 0 | 1 |
| 5 | 1 | 1 | 1 | 1 |
| 6 | 1 | 1 | 1 | 1 |
| 7 | 1 | 1 | 1 | 1 |

3,934,227

MEMORY CORRECTION SYSTEM

BACKGROUND OF THE INVENTION

This invention relates to data processing systems, and particularly to a memory system including means for data correction.

In the construction of a read-only memory (ROM), bits of data are put into locations of a matrix comprising the memory. There are many reasons for memory correction. One reason is that in the fabrication of memory matrices, faulty bits (matrix locations) may be produced. It may also be desired to modify the program embodied in the matrix without removing the entire fixed memory. In order to provide memory correction, an additional memory programmed with corrected data is provided. This memory must be positioned in memory space. In other words, the memory system must decide which of the original data is to be provided from the additional, or overlay, memory and not from the fixed memory. The memory positioning means comprises address decoding circuitry which responds to the address of data and determines whether the data is to be provided from the fixed memory or the overlay memory. In the past, it was necessary to leave positioning means for an overlapping memory undedicated at the time of design of a memory constructed in a printed circuit board. At the time of installation, the address decoding must be designed and implemented to the particular configuration desired. This has involved complex circuitry. In one prior apparatus, a search of memory locations was required and comparison to a standard necessitated in order to determine what bits from the fixed memory were to be replaced by bits from the overlay memory. In simpler configurations, correction capability was extremely limited. In accordance with the present invention, however, the circuitry necessary to locate an overlapping memory in a fixed memory on a printed circuit board is simplified. Therefore, a printed circuit board can be designed without regard to the position in the memory space of the overlapping memory. Positioning means (in the present invention a mapping memory) may be added at the time of assembly or in the field. Versatility of the memory constructed in accordance with the present invention is improved, maintenance and installation costs are reduced, and circuitry is simplified.

SUMMARY OF THE INVENTION

It is therefore a general object of the present invention to provide an improved method of and means for causing a processor to be supplied with correct data when the processor addresses a fixed memory register containing incorrect data.

It is a more specific object of the present invention to provide a fixed memory corrected by an overlay memory, which overlay memory is positioned in memory space by a mapping memory.

It is another object of the present invention to provide a fixed memory and an overlapping memory capable of fabrication on a printed circuit board in a configuration such that memory positioning means may be added to the memory system In accordance with the present invention, an overlay memory and a mapping memory are provided in conjunction with a fixed memory associated with a processor; and all three memories are addressed simultaneously by the processor. The mapping memory is connected to the other two memories such that the state of the addressed mapping memory register will enable one or the other, but not both, of said other two memories to carry out a data transfer to the processor. The states of the mapping memory registers are preselected in accordance with knowledge of which of the fixed memory registers contain incorrect data. When the processor addresses a fixed memory register containing incorrect data, the state of the addressed mapping memory register will be such as to disable the fixed memory thereby precluding it from transferring incorrect data to the processor, and, simultaneously, to enable the overlay memory thereby allowing the addressed overlay memory register to transfer correct data to the processor. In the event no correction of the addressed fixed memory register is desired, the addressed mapping memory register will have a state that simultaneously enables the fixed memory allowing it to transfer data to the processor, and disables the overlay memory.

BRIEF DESCRIPTION OF THE DRAWINGS

The means by which the foregoing objects and features of novelty are provided are pointed out with particularity in the claims forming the concluding portion of the specification. The invention, both as to its organization and manner of operation, may be further understood with reference to the following description taken in connection with the following drawings.

FIG. 2 is a typical schedule of control exerted on the various sections of the overlay memory by each register of the mapping memory.

FIG. 3 is a typical schedule of states for a mapping memory having eight registers, each of which has four cells to control the fixed memory and a three-section overlay memory.

DESCRIPTION OF THE PREFERRED EMBODIMENT

Figure 1:
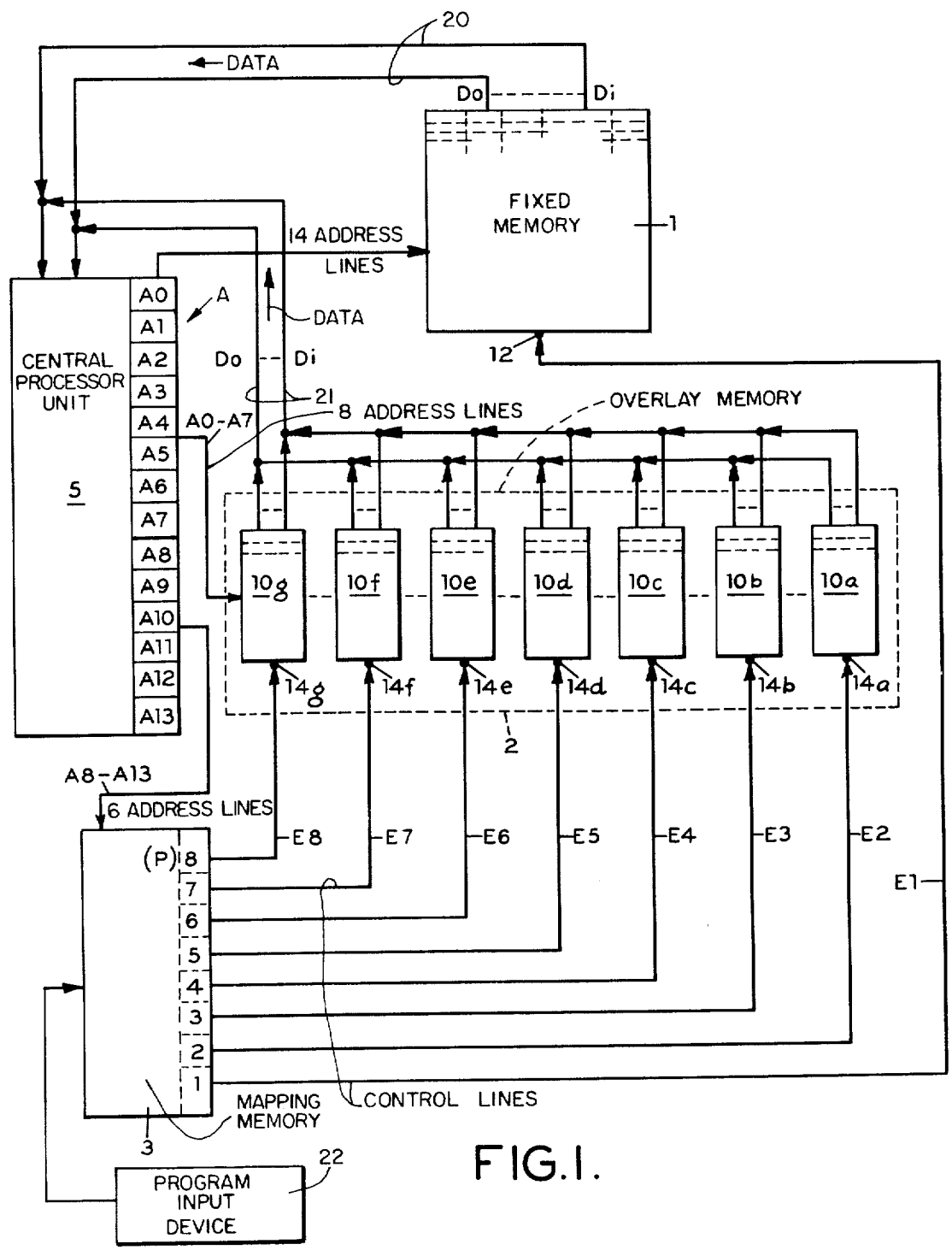
FIG. 1 is a block diagrammatic representation of a memory system constructed in accordance with the present invention.

Referring now to FIG. 1, which is a block diagrammatic representation of a preferred form of the present invention, there is illustrated a fixed memory 1 having a plurality of fixed memory registers some of which are known to contain incorrect data, an overlay memory 2 having a plurality of overlay memory registers which contain correct data, a mapping memory 3 having a plurality of mapping memory registers for controlling the transfer of data to central processor unit 5 from the fixed memory and the overlay memory, and a central processor unit 5 having an address register A containing fourteen cells, designated $A_0$–$A_{13}$, connected so as to address fixed memory 1, overlay memory 2 and mapping memory 3. Fourteen address lines interconnect register A with fixed memory 1 allowing any one of 16,384 fixed memory registers (arranged in a matrix of 64 columns by 256 rows) to be selected by the address in register A. The register in the fixed memory so selected is termed the "addressed fixed memory register", and is the register from which data are furnished to the central processor unit via data lines 20 when control terminal 12 of the fixed memory is enabled. Data lines 20 are designated $D_0$–$D_i$, where $i$ is one less than the total number of cells in each fixed memory register. When control terminal 12 is disabled, no data transfer can take place between the fixed memory and the processor. Note that the six lines ($A_8-A_{13}$) associated with the six most significant bits of the address in register A specify the column of the fixed memory containing the addressed fixed memory register, while the eight lines ($A_0-A_7$) associated with the eight least significant bits of the address specify the row of the fixed memory containing the addressed fixed memory register.

The overlay memory 2 contains seven sections (designated 10a–10g) each having the same number of registers as is contained in a row of the matrix of registers in the fixed memory. Thus, there are 256 overlay memory registers in each section of overlay memory 2 which is interconnected with register A in unit 5 to effect the addressing of the seven sections in parallel. Eight address lines from cells $A_0-A_7$ address the overlay memory allowing any one of the 256 registers in each of the seven sections to be addressed simultaneously. Each of the seven overlay memory registers simultaneously addressed by the address lines $A_0-A_7$ is termed an "addressed overlay memory register". Each section of the overlay memory is provided with a control terminal (e.g., the control terminal of section 10a is designated 14a) which, when enabled, will allow the addressed overlay memory register therein to furnish data to the processor. When a control terminal of a section is disabled, no data transfer from such section to the processor can take place. Only one of the control terminals 14a–14g is enabled at any one time in order to select which one of the seven addressed overlay memory registers is to furnish data via data lines 21 to unit 5, it being understood that each overlay memory register contains the same number of cells as a fixed memory register.

The mapping memory 3 contains one register for each column of the matrix of registers in the fixed memory. Thus, there are 64 registers in the mapping memory, each having eight cells and interconnected to register A in unit 5 by six address lines originating from cells $A_8-A_{13}$ allowing any one of the mapping memory registers to be selected by the address of register A. The mapping memory register selected by the address lines $A_8-A_{13}$ is termed the "addressed mapping memory register". Control lines $E_1-E_8$ interconnect the eight output cells of the mapping memory with the control terminals of the fixed memory and the overlay memory. Thus, control line $E_1$ is connected from output cell 1 of the mapping memory to control terminal 12 of fixed memory 1, and control lines $E_2-E_8$ are respectively connected from output cells 2–8 of the mapping memory to control terminals 14a–14g of the seven sections of overlay memory 2. If output cell 1 of the addressed mapping memory register has a state enabling terminal 12, then each output cells 2–8 of the addressed mapping memory register must be in a state that disables control terminals 14a–14g of the overlay memory thereby allowing for the data in the addressed fixed memory register to be transferred to unit 5 via lines 20 and simultaneously suppressing the transfer of data from each of the addressed overlay memory registers. On the other hand, if output cell 1 of the addressed mapping memory register has a state that disables terminal 12 of the fixed memory, then one and only one of the output cells 2–8 can be in an enabling state thereby enabling but one section of the overlay memory and allowing data in the addressed overlay memory register in the enabled section to be transferred to the processor via lines 21. In order to establish the states of each of the mapping memory registers, the mapping memory is provided with a program input device 22 whose operation permits the states of the mapping memory registers to be preselected in accordance with knowledge of the addresses of those fixed memory registers containing incorrect data, and according to which of the sections of the overlay memory is available to receive correct data.

The address of a fixed memory register containing incorrect data (referred to hereinafter as the "faulty fixed memory register") immediately specifies the one mapping memory register (termed the "specified mapping memory register") whose state will control selection of the source of data transferred to the processor when the faulty fixed memory register is addressed and also specifies the seven overlay memory registers (one in each of the seven overlay memory sections) available for receiving correct data. Once a decision is made on which one of the seven available overlay memory registers is to receive the correct data, the state of the specified mapping memory register is defined; and device 22 is utilized to establish such state. For example, if a faulty fixed memory register is located at column 64 at row 15 of the matrix of the fixed memory, then the specified mapping memory register is number 64, and the seven specified overlay memory registers in each of the seven sections of the overlay memory occupy position 15 in each section. If corrected data is inserted into register 15 of the first section (i.e., 10a) of the overlay memory, for example, the state of mapping memory register 64 is established by device 22 following this procedure:

Cell 1 is placed into a "disable" state so as to disable the fixed memory when the processor addresses the faulty fixed memory register;

Cell 2 is placed into an "enable" state so as to enable the first section of the overlay memory when the processor addresses the faulty fixed memory register; and Cells 3–8 are each placed into a "disable" state so as to disable the second through seventh sections of the overlay memory when the processor addresses the faulty fixed memory register.

For the above-disclosed configuration of fixed memory, mapping memory and overlay memory, 1,792 different fixed memory registers can be corrected (this being the total number of registers in the overlay memory). When the desired number of faulty fixed memory registers has been corrected following the procedure outlined above, the operation of th device shown in FIG. 1, when the address in register A is the address of a faulty fixed memory register, is as follows:

The eight least significant bits of the address will address the overlay memory register containing the corrected data (as well as registers in six sections other than the one containing the correct data), and the six most significant bits of the address will address the mapping memory register whose state has been preselected to disable the fixed memory and enable only the section of the overlay memory containing the register with the correct data.

The size and configuration of the various memories, shown in the drawing and described above, are exemplary of the present invention. In general, an address in register A will have $m$ most significant bits and $n$ least significant bits establishing a fixed memory with $2^{m+n}$ registers that can be addressed uniquely by register A. For example, if $m = 6$ and $n = 8$, the fixed memory can have $2^{14}$ or 16,384 registers. Furthermore, the mapping memory will have $2^m$ registers. For example, if $m = 6$, the mapping memory will have $2^6$ or 64 registers. Finally, if each register in the mapping memory has P cells, then the number of sections in the overlay memory must be P − 1.

Referring now to FIG. 2, each row in the column headed "Block Location" is the number of a register in the mapping memory. For example, a system in which the mapping memory is addressed by $m$ bits of the address in register A, the number of registers in the mapping memory will be $2^m$ so that if the first register is designated "zero" the last one is designated "$2^m$ - 1".

The column headed "Fixed Mem. Enable" contains symbols that designate the function to be carried out by the respective registers in the mapping memory thereby providing a schedule that can be followed in setting the sets of the various memory registers. For example, the symbol $0_1$ associated with the "zero" mapping memory register means that the state of this register is to be such as to disable the fixed memory and enable only the first section of the overlay memory. The entries found under the headings "Overlay 1" etc. are binary notations indicating whether a given section of the overlay memory is to be enabled or disabled in carrying out the function specified by the entry under the heading "Fixed Mem. Enable". The notation ZERO indicates a section is to be enabled while the notation ONE indicates that the section is to be disabled.

Referring now to FIG. 3, each entry in the column headed "Address" is a number specifying one of eight mapping memory registers, the state of each of the four cells of a given mapping memory register being indicated by the binary designation under the column headings "Bit 0 Data", etc. which specify the bit position of a cell in the register. "Bit 0" controls the fixed memory, while "Bit 1" controls the first section of the overlay memory, etc. The notation ZERO in the "Bit 0" column means the state of the cell containing this bit is such as to disable the fixed memory while the notation ONE in this column means the fixed memory is enabled. The notation ZERO in "Bit 1", "Bit 2" or "Bit 3" columns means the state of this cell containing this bit is such as to enable the specified section of the overlay memory, while the notation ONE means the section is disabled.

What is claimed is:

1. A memory system for use with a central processor unit having an address register comprising:
   a. a fixed memory having a plurality of fixed memory registers addressable by the address register of the central processor unit, and a control input for enabling or disabling the fixed memory in accordance with the state of the control input;
   b. an overlay memory having a plurality of sections of overlay memory registers, corresponding registers in each section being addressable simultaneously by a first portion of the address in the address register of the central processor unit;
   c. each section of the overlay memory having a control input for enabling or disabling such section in accordance with the state of its control input; and
   d. a mapping memory having a plurality of mapping memory registers addressed by a second portion of the address of the address register of the central processor unit;
   e. a first cell of each register of the mapping memory having a predetermined content and being connected to the control input of the fixed memory for establishing the state of such control input; and
   f. the remaining cells of each register having predetermined contents and being respectively connected to the control inputs of the sections of the overlay memory for establishing the state of each of such sections whereby the contents of the first cell of the addressed memory register determines whether the fixed memory is enabled or disabled, and the contents of the remaining cells of the addressed memory register disables all of the sections when the fixed memory is enabled, and enables one and only one of the sections when the fixed memory is disabled.

2. A memory system according to claim 1 for use with a central processor having an address register having $m$ most significant bits and $n$ least significant bits wherein:
   a. said fixed memory has $2^{m+n}$ memory registers;
   b. said overlay memory has (P−1) sections each having $2^n$ registers addressable by the least significant bits of the addressed register of the central processor unit; and said mapping member has $2^m$ registers each of which has P cells.

3. A method for causing a processor to be supplied with correct data when the processor addresses a fixed memory register containing incorrect data comprising:
   a. providing an overlay memory with at least one section having a plurality of registers;
   b. providing a mapping memory having a plurality of registers each of which has a first cell associated with the fixed memory and at least a second cell associated with said one section of the overlay memory;
   c. causing one mapping memory register and one overlay memory register in said one section to be addressed simultaneously with the addressing of one fixed memory register;
   d. enabling or disabling the fixed memory depending upon the state of said first cell of the addressed mapping memory register;
   e. enabling or disabling said one section of the overlay memory depending upon the state of said second cell of the addressed mapping memory registers;
   f. inserting correct data in the overlay memory register that would be addressed were the processor to address the fixed memory register containing incorrect data; and
   g. preselecting the states of the cells of the mapping memory register that would be added were the processor to address the fixed memory register containing incorrect data such that its first cell is in a disabling state, and its second cell is in an enabling state.

* * * * *